(12) United States Patent
Graf et al.

(10) Patent No.: US 9,574,695 B2
(45) Date of Patent: Feb. 21, 2017

(54) INNER SEAL COLLAR WITH IMPROVED LOCKING MECHANISM

(71) Applicant: GRAF PATENTVERWERTUNGS GBR, Bad Dürrheim (DE)

(72) Inventors: Jürgen Graf, Bad Dürrheim (DE); Joachim Graf, Bad Dürrheim (DE)

(73) Assignee: GRAF PATENTVERWERTUNGS GBR, Bad Duerrheim (DE)

( * ) Notice: Subject to any disclaimer, the term of this patent is extended or adjusted under 35 U.S.C. 154(b) by 0 days.

(21) Appl. No.: 14/442,500

(22) PCT Filed: Nov. 21, 2013

(86) PCT No.: PCT/EP2013/074424
§ 371 (c)(1),
(2) Date: May 13, 2015

(87) PCT Pub. No.: WO2014/079955
PCT Pub. Date: May 30, 2014

(65) Prior Publication Data
US 2016/0281899 A1    Sep. 29, 2016

(30) Foreign Application Priority Data

Nov. 23, 2012 (DE) .......................... 10 2012 111 341
Nov. 23, 2012 (DE) .......................... 20 2012 012 667

(51) Int. Cl.
*F16L 55/16* (2006.01)
*F16L 55/163* (2006.01)

(52) U.S. Cl.
CPC .................................... *F16L 55/163* (2013.01)

(58) Field of Classification Search
USPC .................. 138/97, 98; 405/150.1, 184.2
See application file for complete search history.

(56) References Cited

U.S. PATENT DOCUMENTS 5,086,809 A * 2/1992 Bridges ................... F16L 21/06
138/97
5,190,705 A * 3/1993 Corazza .................... E03F 3/06
138/97

(Continued)

FOREIGN PATENT DOCUMENTS

CN    102 612 619 A    7/2012
DE    93 18 409 U1     2/1994

(Continued)

OTHER PUBLICATIONS

Office Action issued in corresponding Chinese application No. 201380061407.9, Dec. 1, 2015.

(Continued)

*Primary Examiner* — James Hook
(74) *Attorney, Agent, or Firm* — Juneau & Mitchell

(57) ABSTRACT

The invention is an inner seal collar for inserting into pipes in order to seal leakage points in the pipes, comprising an expandable strip which is bent into the shape of a ring and which is preferably made of steel sheet, parts of the strip at least partly overlapping in the circumferential direction, and comprising a locking device which has at least two parallel rows of teeth, wherein a separate clamping pinion engages into at least two of the rows of teeth. The invention comprises a separate blocking pinion paired with each of the at least two clamping pinions, the blocking pinion pushing against the corresponding clamping pinion via a respective spring element and being engaged with the clamping pinion, and each of the blocking pinions is also engaged with the corresponding row of teeth.

19 Claims, 9 Drawing Sheets

(56) References Cited

U.S. PATENT DOCUMENTS

| | | | | |
|---|---|---|---|---|
| 5,351,720 | A | * 10/1994 | Maimets | F16L 55/18 |
| | | | | 138/98 |
| 5,465,758 | A | 11/1995 | Graf et al. | |
| 5,769,459 | A | * 6/1998 | Graf | F16L 55/163 |
| | | | | 138/97 |
| 2008/0193221 | A1 | * 8/2008 | Lee | F16L 55/134 |
| | | | | 405/184.2 |

FOREIGN PATENT DOCUMENTS

| | | |
|---|---|---|
| DE | 44 01 318 A1 | 3/1995 |
| DE | 295 19 073 U1 | 1/1996 |
| DE | 195 44 877 C1 | 10/1996 |
| DE | 20 2010 013588 U1 | 11/2010 |
| DE | 10 2009 047863 A1 | 3/2011 |

OTHER PUBLICATIONS

International Search Report issued in corresponding PCT Application No. PCT/EP2013/074424, Jan. 28, 2014.
Office Action issued in corresponding German application No. 10 2012 111 341.6, Jul. 30, 2013.

* cited by examiner

INNER SEAL COLLAR WITH IMPROVED LOCKING MECHANISM

CROSS REFERENCE TO RELATED APPLICATIONS

This patent application claims priority to International Patent Application PCT/EP2013/074424, filed on Nov. 21, 2013, and thereby to German Patent Application 10 2012 111 341.6, filed on Nov. 23, 2012 and German Patent Application 20 2012 012 667.9, also filed on Nov. 23, 2012.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention relates to an inner seal collar with improved locking mechanism for insertion into pipes, for the purpose of sealing leak points in the same.

Background of the Invention

Such internal sealing collars have been known for a long time, and are described by way of example in DE 44 01 318 C2. Using such internal sealing collars, it is possible to repair leakage points in, for example, underground pipes made of concrete or another material, without trenching. For this purpose, the internal sealing collar is inserted into the leaking pipe being repaired, up to the position of the leak. In this process, the internal sealing collar is initially spirally compressed such that it has a smaller diameter than the pipe being sealed. Once the internal sealing collar has been moved into the position of the leak in the pipe being repaired, the internal sealing collar is expanded by means of a mechanical installation device until it has come into very tight contact with the inner wall of the pipe, compressing the seal rings. The internal sealing collar is held in its expanded position by means of an arresting device which has a tensioning pinion which meshes with a toothed bar, and a spring-loading locking pinion which engages with the same.

EP 0 805 932 B1 suggests an arresting device which is improved over the above. The document discloses an internal sealing collar having an arresting device which enables very small locking steps and therefore ensures a strong, permanent contact with the inner pipe wall following its expansion, providing a strong press force on the sealing organs. The improved arresting device comprises, for this purpose, a slot arranged peripherally around the belt end on the inside, wherein a toothed bar is arranged on each of the two opposing longitudinal edges thereof. Two tensioning pinions are arranged in the slot, each of these engaging with one of the two toothed bars, and also being loaded by one locking pinion which functions as the locking organ. The locking pinion is pressed into the intermediate space between the two tensioning pinions by a tensioning spring.

An internal sealing collar having such an arresting device is in need of improvement with respect to the force load which can be achieved.

The aim of the present invention is therefore that of advancing the known internal sealing collars in such a manner that the arresting device can receive greater forces—that is, such that it is more difficult to unlock than previously.

BRIEF SUMMARY OF THE INVENTION

In a preferred embodiment, an internal sealing collar (1) for the purpose of insertion into pipes to seal leak points in the same, having a belt (2) which is compressed circularly and can be expanded, preferably made of sheet steel, the belt parts (3, 4) of which preferably overlap in the peripheral direction at least partially, and having an arresting device (10) which comprises at least two rows of teeth (21, 22) which are arranged parallel to each other, wherein one tensioning pinion (31, 32) for each of at least two of the rows of teeth (21, 22) engages in the same, characterized in that one locking pinion (41, 42) each is functionally assigned to the at least two tensioning pinions (31, 32), each locking pinion (41, 42) pressing against the associated tensioning pinion (31, 32) via one spring element (51, 52) each, and engaging with the same, and wherein each of the locking pinions (41, 42) additionally engages with the associated row of teeth (21, 22).

In another preferred embodiment, an internal sealing collar as described herein, characterized in that, for each of the at least two rows of teeth (21, 22), one of the tensioning pinions (31, 32) engages in the same.

In another preferred embodiment, an internal sealing collar as described herein, characterized in that two rows of teeth (21, 22) are arranged on opposite longitudinal edges (24, 25) of a toothed bar (20) constructed on the inside belt part (2).

In another preferred embodiment, an internal sealing collar as described herein, characterized in that each of the locking pinions (41, 42) has a lower tooth count than the associated tensioning pinion (31, 32).

In another preferred embodiment, an internal sealing collar as described herein, characterized in that each of the spring elements (51, 52) is a tensioning spring which is fixed by one end thereof, directly or indirectly, to the outside belt part (4), and on the other end thereof is inserted in an axle region of the associated locking pinion (41, 42).

In another preferred embodiment, an internal sealing collar as described herein, characterized in that the two tensioning pinions (31, 32) are each fixed on the outside belt part (4) via their own axle pin (34, 35), and the associated spring elements (51, 52) at least partially wind around each of these axle pins (34, 35).

In another preferred embodiment, an internal sealing collar as described herein, characterized in that each of two opposing rows of teeth (21, 22) of the toothed bar (20) belongs to an elongated first recess (81) and an elongated second recess (82), respectively, the same running parallel to each other.

In another preferred embodiment, an internal sealing collar as described herein, characterized in that the two recesses (81, 82) are each designed as slots.

In another preferred embodiment, an internal sealing collar as described herein, characterized in that at least one of the recesses (82) extends from one row of teeth (22) of the toothed bar (20) to an end-face end (2A) of the belt (2).

In another preferred embodiment, an internal sealing collar as described herein, characterized in that each of the locking elements and/or locking pinions (41, 42) has an overhung mounting.

In another preferred embodiment, an internal sealing collar as described herein, characterized in that a hold-down plate (70) is included which is attached on the outside belt part (4) and overlaps at least one of the two rows of teeth (21, 22) with the associated tensioning pinion (31, 32) and locking element (41, 42).

In another preferred embodiment, an internal sealing collar as described herein, characterized in that the hold-down plate (70) comprises a hold-down element (74)— particularly a hold-down bolt—on the side thereof which is functionally assigned to the toothed bar (20), for the purpose of pressing the toothed bar (20) toward the outside belt part (4).

In another preferred embodiment, an internal sealing collar as described herein, characterized in that the axle pins (34, 35) of the two tensioning pinions (31, 32) are designed as bolts or rivets, each projecting through corresponding bore holes (76, 77) of the hold-down plate (70).

In another preferred embodiment, an internal sealing collar as described herein, characterized in that the hold-down plate (70) overlaps at least a part of the two rows of teeth (21, 22), as well as the associated tensioning pinion (31, 32) and locking elements (41, 42).

In another preferred embodiment, an internal sealing collar as described herein, characterized in that two hold-down plates (70, 70A; 70B, 70C) are included.

In another preferred embodiment, an internal sealing collar as described herein, characterized in that each of the two hold-down plates (70) additionally overlaps a slot which runs parallel to the respective row of teeth (21, 22), wherein a fixed bolt sits in said slot.

In another preferred embodiment, an internal sealing collar as described herein, characterized in that for each of two rows of teeth (21, 22), one slot, positioned opposite, is functionally assigned to the same—a bolt (92) projecting into said slot (90).

In another preferred embodiment, an internal sealing collar as described herein, characterized in that an element (93) which is able to rotate, particularly a rotating disk, is mounted on the bolt (92) or bolts.

In another preferred embodiment, an internal sealing collar as described herein, characterized in that a toothed gear (94) is mounted on the bolt (92) and meshes with a further row of teeth (23) arranged in the slot (90).

DETAILED DESCRIPTION OF THE INVENTION

The invention substantially consists of the provision of two rows of teeth, wherein a different tensioning pinion with an associated locking element engages with each. In this case, each of the locking elements is arranged with the two associated tensioning pinions is designed as a locking pinion. As a result of two rows of teeth being used, and the tensioning pinions assigned to the same, the arresting mechanism is able to receive twice the force via the toothed bar. Each of the two tensioning pinions, and also each of the locking pinions which meshes with the tensioning pinions, engage with the associated row of teeth and mesh with the same.

In addition, it is advantageous that the locking forces of the tensioning pinion act on the toothed bar, thereby ensuring high static stability of the entire arrangement. Due to the use of a locking pinion which interacts with a tensioning pinion, the configuration achieves half the tooth pitch in comparison with the use of another locking element—such as a detent pin, for example. In this configuration, it is advantageous that the path traveled if the expanded internal sealing collar slips back can only be half of a tooth width.

DETAILED DESCRIPTION OF THE FIGURES

Figure 1:
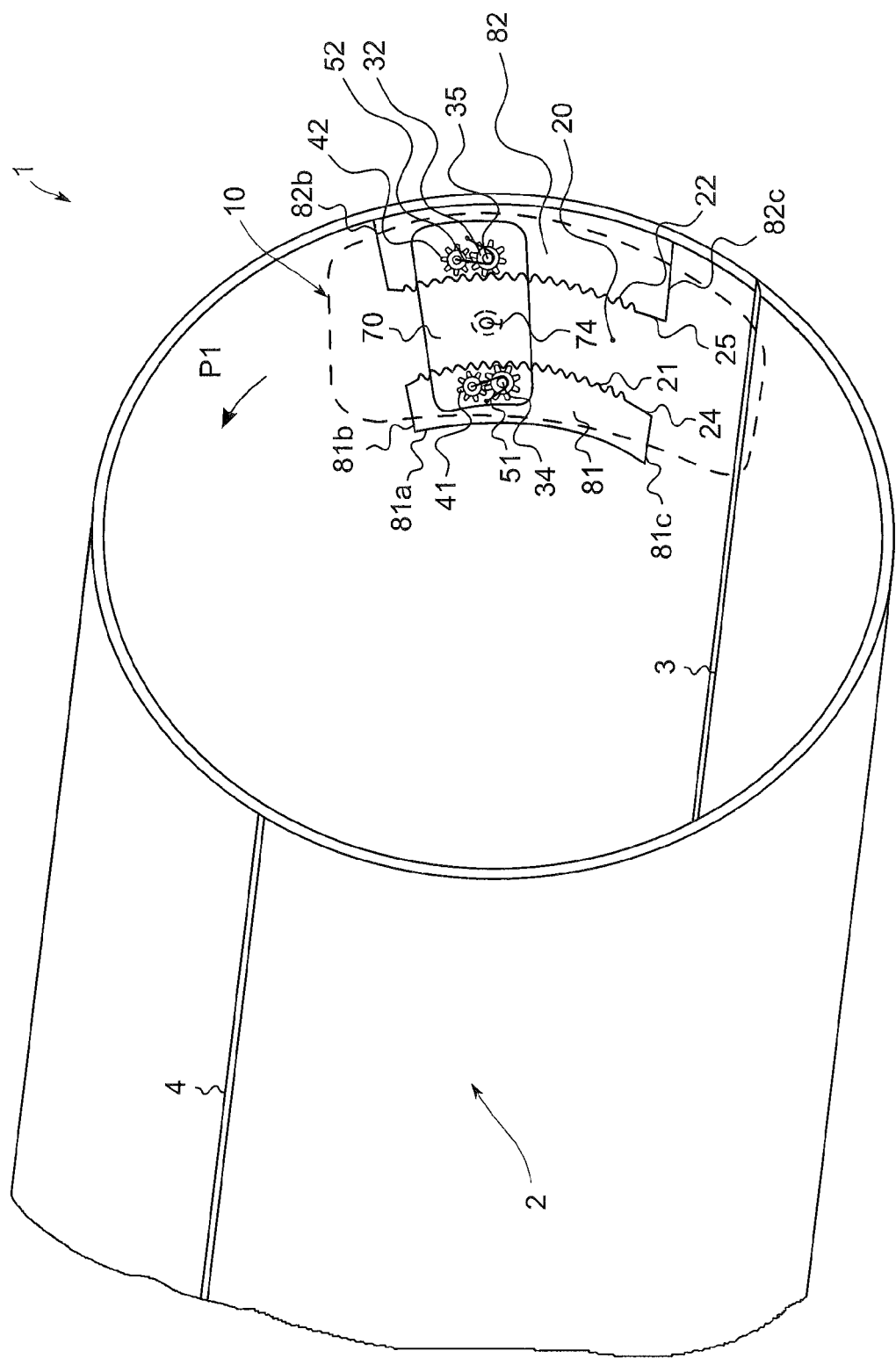
FIG. 1 is a line drawing evidencing a perspective view, from outside into a part of an internal sealing collar, of the arresting device arranged at this point, according to a first embodiment of an internal sealing collar.

FIG. 1 shows a perspective view of a part of an internal sealing collar 1. The observer has a perspective of a compressed belt 2 which is preferably made of sheet steel or the like. In the rolled-up configuration shown, the belt 2 has a belt end and/or belt part 3 on the inside, and a belt end and/or belt part 4 on the outside. So that the belt 2 remains in this rolled-up configuration and its diameter cannot get smaller, a special arresting device 10 is included—and is described in detail further below. The arresting device 10 illustrated in FIG. 1 can be seen in an enlarged illustration and from a top view in the region of FIG. 3 marked by dashed lines.

An essential feature of the arresting device 10 is a toothed bar 20 with a first row of teeth 21 and a second row of teeth 22 opposite the first. The toothed bar 20 is—as can be seen most clearly in FIG. 1—molded as a single piece, by its two ends, to the belt part 3 on the inside, as a result of a slot-like first recess 81 being arranged left of the first row of teeth 21, and a similar recess 82 being arranged right of the second row of teeth 22. However, the second recess in the embodiment in FIG. 1 has a design which is open toward the open side of the wound-up belt 2. In contrast, in FIG. 2, the recess 82 in fact has a similar design to the recess 81. This means that in the embodiment in FIG. 2, the recess 82 is also bounded by a wall section 2A of the belt 2 on the open end face.

Figure 2:
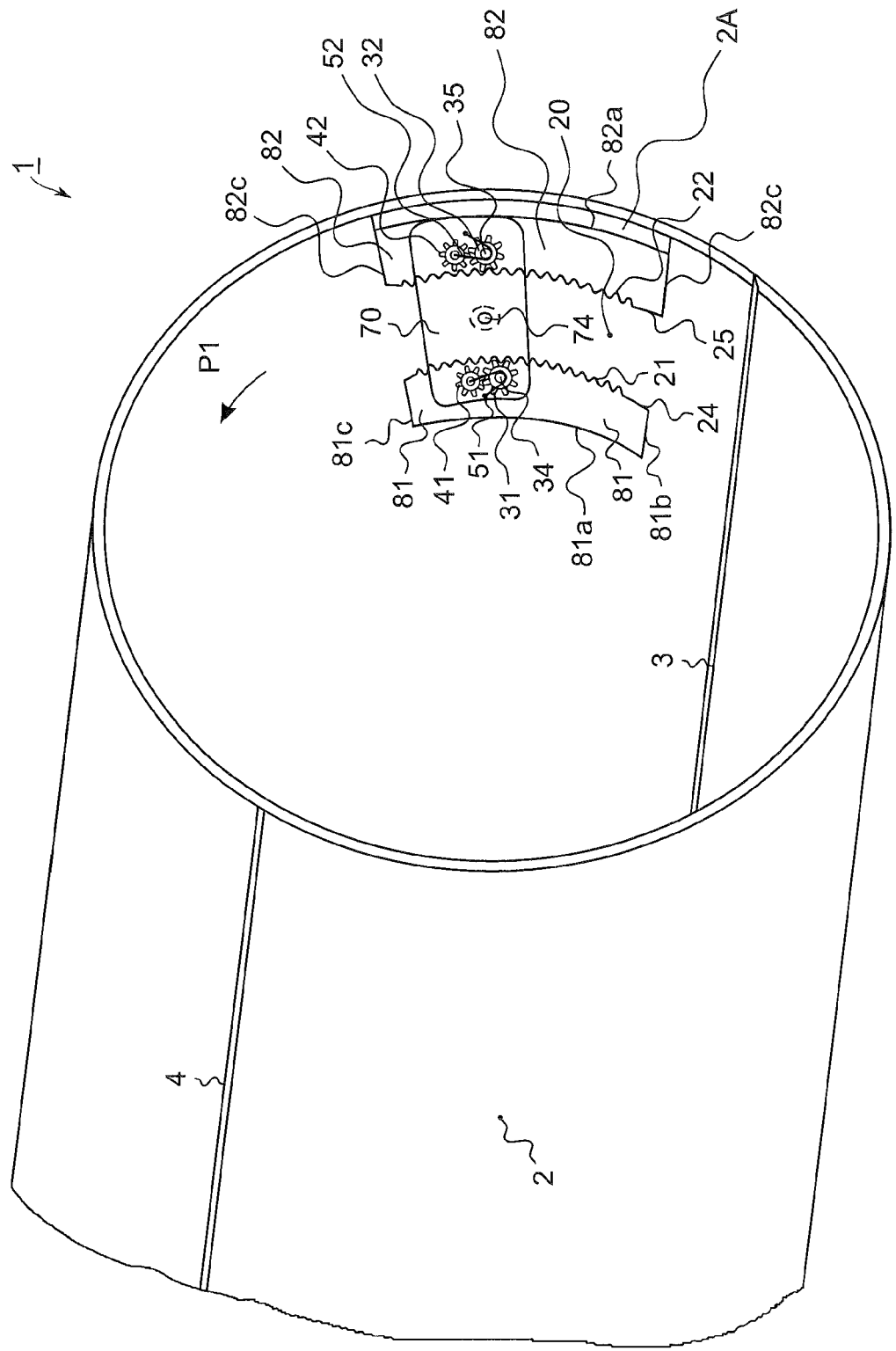
FIG. 2 shows a view similar to that of FIG. 1, according to a second embodiment of the internal sealing collar.

In both embodiments in FIG. 1 and FIG. 2, the toothed bar 20 is—seen in the peripheral direction of the wound-up belt 2—an integral component of the belt part 3 on the inside. In this case, the first row of teeth 21 runs along a first longitudinal edge 24, and the second row of teeth 22 runs along a second longitudinal edge 25 of the toothed bar 20. The two longitudinal edges 24, 25, and therefore the two rows of teeth 21, 22, are oriented parallel to each other.

The toothed bar 20 can, with its two rows of teeth 21, 22, have a length which is approximately between an eighth-circle arc and a semi-circle, or somewhat more. However, different lengths can be used. This depends to a critical degree on which outer diameter the internal sealing collar 1 needs to have to be able to seal a corresponding defective pipe.

As can be seen in FIG. 1, the slot-like recess 81 illustrated at left is bounded on its right side by the first longitudinal edge 24, mentioned above, which carries the first row of teeth 21 of the toothed bar 20. On the opposing side, the recess 81 is bounded by a longitudinal edge 81a which does not carry any row of teeth. This longitudinal edge 81a is connected to the first longitudinal edge 24 on its upper and lower ends via transverse edges 81b and 81c running at a right angle.

The right recess 82 comprises the second longitudinal edge 25 of the toothed bar 20, which carries the second row of teeth 22. In contrast to the recess 81, the recess 82 in FIG. 1 is open on its right, wherein the second longitudinal edge 25, with the second row of teeth 22, transitions on its upper end and lower end at a right angle into two transverse edges 82b, 82c.

As mentioned above, when the embodiment in FIG. 2 is considered, the right recess 82 has a similar design to the left recess 81. This means that the second longitudinal edge 25 of the toothed bar 20, with the second row of teeth 22 arranged on the same, is situated opposite a straight longitudinal edge 82a which has no row of teeth. As a result, as shown in FIG. 2, a narrower belt section and/or strut is present which runs parallel to the longitudinal edge 82a of the belt 2. This region is marked by the reference number 2A.

In each of the two recesses 81 and 82, two rows of teeth are placed in a particular manner. Specifically, a first tensioning pinion 31 which meshes with the first row of teeth 21 is arranged in the first recess 81. For this purpose, the first tensioning pinion 31 is mounted on an axle pin 34 which is fixed to the belt part 4 on the outside. This fixture can be achieved by riveting or welding, for example. Other connection means are likewise possible.

Figure 3:
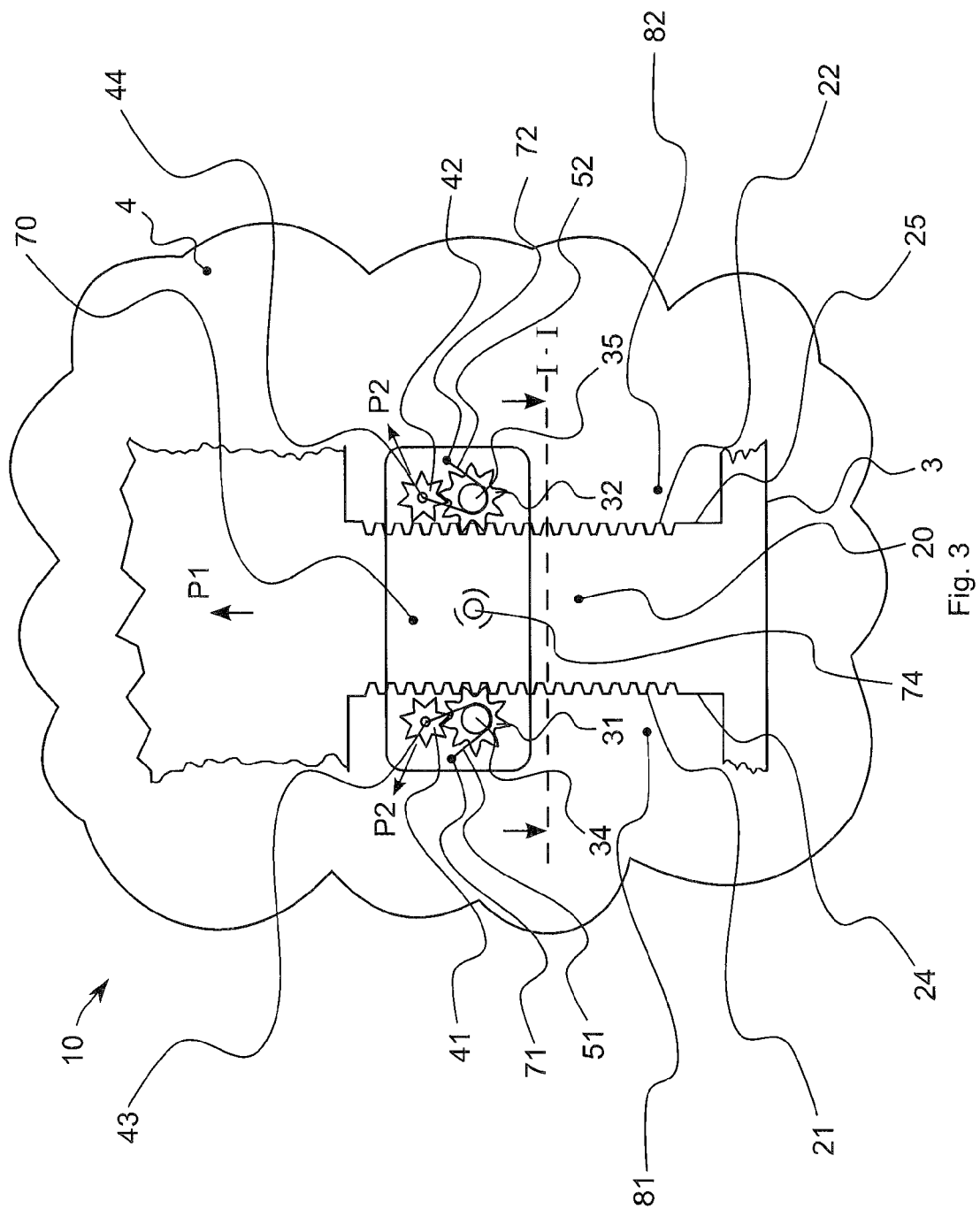
FIG. 3 is a line drawing evidencing an arresting device in FIG. 1, in a section along the dotted cutaway line in FIG. 1.

In the embodiment in FIGS. 1 to 3, the first tensioning pinion has, by way of example, nine teeth which are able to mesh with the first row of teeth 21 when the first tensioning pinion 31 rotates. A first locking pinion 41 is functionally assigned to this first tensioning pinion 31. This first locking pinion 41 has an overhung mounting. This means that the axis of the locking pinion 41 is not fixed. Rather, this first locking pinion 41 is pressed by a spring element 51 against the first tensioning pinion 31, such that the first locking pinion 41 is held in engagement with both the tensioning pinion 31 and the first row of teeth 21. The spring element 51 in the present case is a tensioning spring which winds around the axle pin 34 in a U shape and engages by one end thereof in a central bore hole of the locking pinion 41. The other end is attached directly or indirectly on the outside belt part 4.

In the present embodiment, this other end of the spring element 51—that is, the tensioning spring—is fixed by a bore hole 71 being made in a hold-down plate 70, wherein the end of the spring element 51 which is bent at an angle can engage in the same. This hold-down plate 70 has a rectangular design, for example, and overlaps the first row of teeth 21, as well as the first tensioning pinion 31, the first locking pinion 41, and the spring element 51. The hold-down plate 70 has a fixed connection to the outside belt part 4. This connection in the embodiment shown is the result of the fact that the axle pin 34 attached to the outside belt end 4 is also fixed to the hold-down plate 70. As such, the axle pin 34 can be permanently riveted not only to the outside belt end 4, but also to the hold-down plate 70. As an alternative, it is also possible for the hold-down plate 70 to be bolted to the outside belt end.

As can be seen in FIGS. 1 to 3, a second tensioning pinion 32 with a second locking pinion 42 and a second spring element 52, in the form of a tensioning spring, is arranged on the second row of teeth 22 in a similar manner. The ends of this second spring element 52 are again inserted into a bore hole of the second spring element 52, and into a corresponding bore hole 72 of the hold-down plate 70. The locking element 42 in this case winds around the axle pin 35 around an angle of approximately 180°, wherein the second tensioning pinion 32 can rotate around said axle pin [35]. This axle pin 35 as well can be designed as a rivet or bolt.

The hold-down plate 70 serves the purpose of pressing the toothed bar 20 down during the tensioning process. For this purpose, a hold-down element 74—for example in the form of a plastic knob—can be attached on the side of the hold-down plate 70 which faces the toothed bar 20. The toothed bar 20 glides along this hold-down element 74 when the internal sealing collar 1 is expanded, and is pressed down. This can be very clearly seen in FIG. 4, which shows a cutaway view of FIG. 3 along the cutaway line I-I shown in the same figure. It can be seen that the hold-down element 74 sits on the toothed bar 20.

In the embodiments presented in FIGS. 1 to 3, each of the tensioning pinions 31, 32 has a lower tooth count than the two locking pinions 41, 42. This can, but need not necessarily, be the case.

The functionality of such an arresting device 10 is as follows.

When the internal sealing collar 1 is installed in a pipe being sealed, the internal sealing collar 1 is initially introduced with a reduced diameter, and therefore in a somewhat rolled-up state, into the pipe being sealed. An assembly dolly is used for this purpose, bringing the internal sealing collar 1 to the necessary point in the pipe being sealed. Once arrived at the point to be sealed, the assembly dolly effects the expansion of the internal sealing collar. To this end, the inside belt part 3 is moved along the direction of arrow P1 relative to the outside belt part 4. A direction of movement corresponding to the arrow P1 is possible because the two locking pinions 41, 42 with an overhung mounting yield, along the direction of arrow P2 shown in FIG. 3, outward and therefore away from each other, thereby allowing the two tensioning pinions 31, 32 to rotate freely about their axle pins 34, 35 due to the two rows of teeth 21, 22 being pushed upward.

In contrast, a movement against the direction of arrow P1 is essentially impossible because the arresting device 10, described above, locks in this case. The two tensioning springs 51, 52 pull the two locking pinions 41, 42 in the direction of the tensioning pinions 31, 32, and therefore likewise engage with the same, as well as the two rows of teeth 21, 22 of the toothed bar 20. A movement of the inner belt part 3 against the direction of arrow P1 is therefore effectively blocked.

As a result of the fact that each of the two separate tensioning pinions 31, 32 on the toothed bar 20 engages with its own locking pinion 41, 42, a greater arresting force is reached compared to conventional arresting devices. The high arresting forces are the result of the fact that the arresting device has four toothed gears—that is, the two tensioning pinions 31, 32 and the associated locking pinions 41, 42—all of which engage with the toothed bar 20 in the locking direction.

Due to the fact that the locking forces of the tensioning pinion 31 and the associated locking pinion 41, left and right on the toothed bar 20, act on the tensioning pinion 32 and the associated locking pinion 42 on the right row of teeth 22, the locking forces of these toothed gears advantageously work against each other, thereby resulting in an increased static stability of the entire arrangement. In contrast to EP 0 805 932 B1, cited in the introduction to the descriptive portion, the locking forces of the two tensioning pinions in the internal sealing collar described therein act away from each other.

Figure 4:
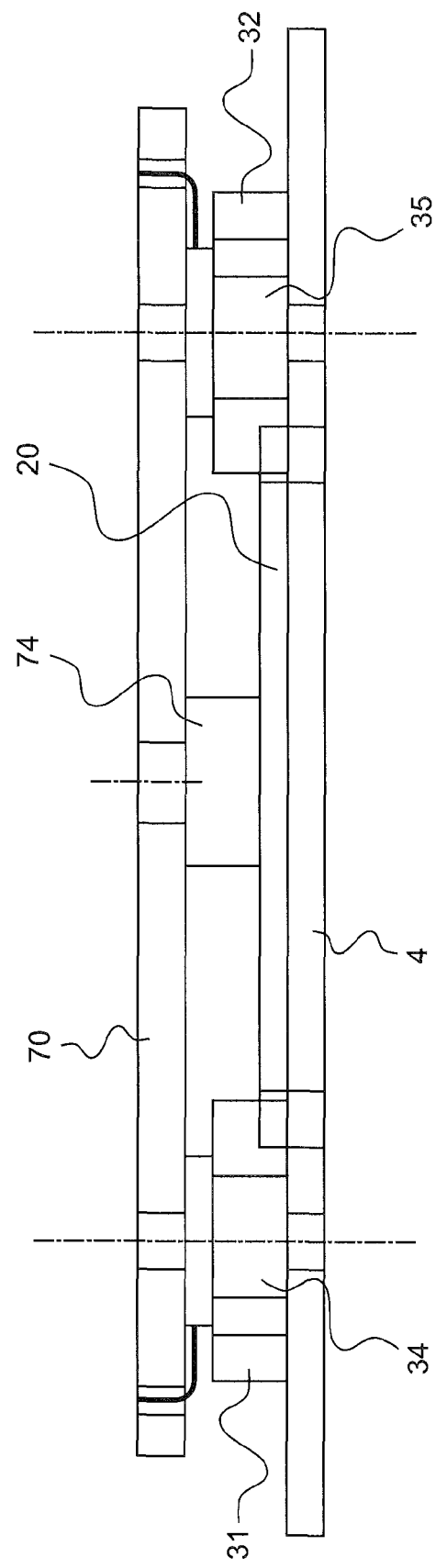
FIG. 4 is a line drawing evidencing a cutaway view along the cutaway line I-I in FIG. 3.
Figure 5:
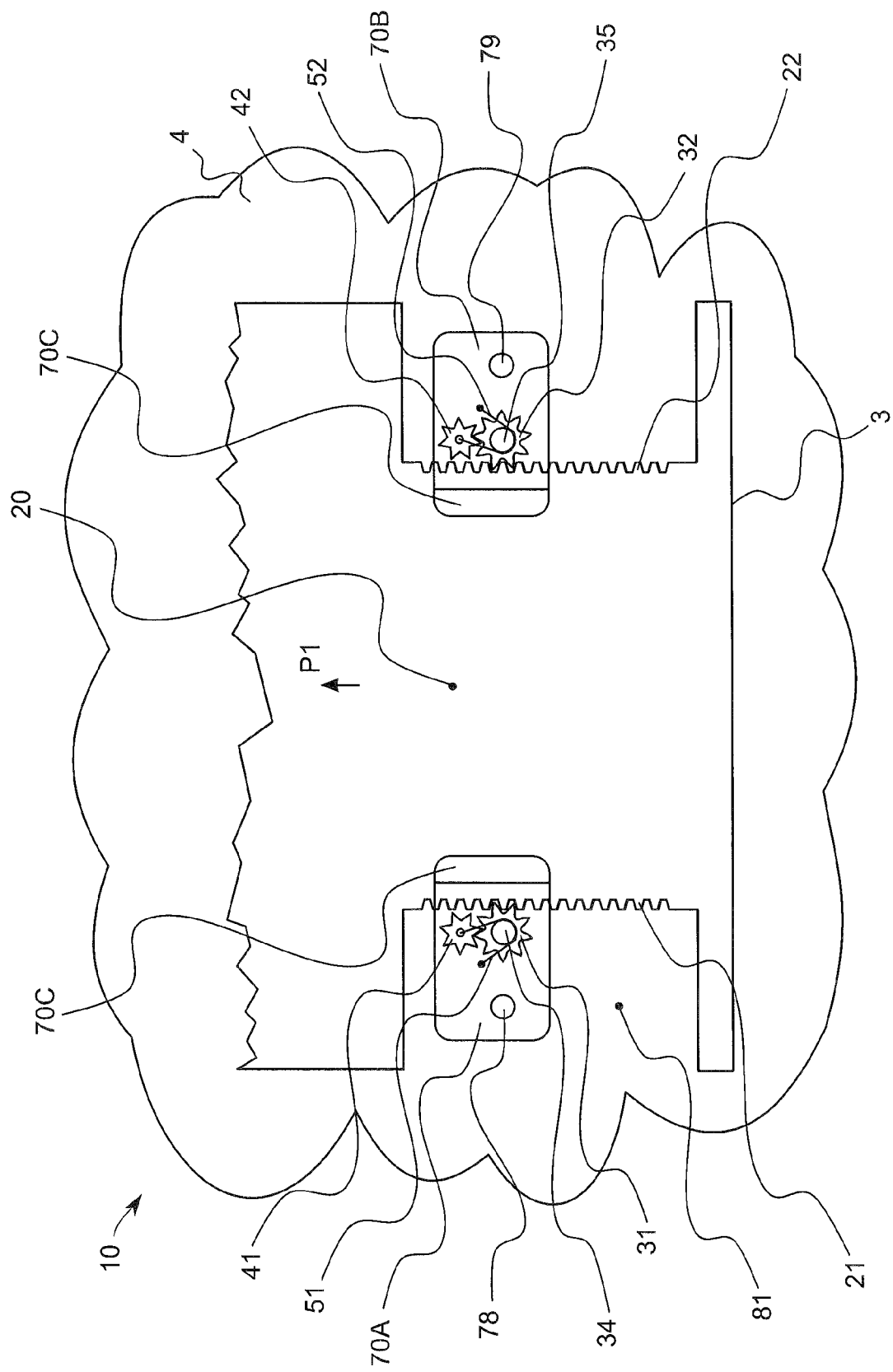
FIG. 5 is a line drawing evidencing a cutaway view of a third embodiment of an internal sealing collar according to the invention, having a relatively wider toothed bar, and two hold-down devices attached to the same.

FIG. 5 shows a third embodiment of an internal sealing collar, in the region of the arresting device 10. In contrast to the embodiments above, the toothed bar 20 in this case is significantly wider, and the hold-down plate has a two-part design. This means that there is not only one hold-down plate which overlaps the entire toothed bar 20 and the associated tensioning pinions 31, 32 and locking pinions 41, 42. Rather, one smaller hold-down plate 70A is included for each, only overlapping a portion of the toothed bar 20, and being fixed—by way of example riveted or bolted—to the outside belt part 40 via a bolt 78. This bolt 78 is positioned, as shown in FIG. 4, in the recess 81 for the hold-down plate 70A illustrated at left therein. The hold-down plate 70B overlaps a left-hand part of the toothed bar 20, and is fixed—that is, riveted or bolted—to the outside belt part 4 via a bolt 78. This bolt 78 is positioned, as shown in FIG. 4, in the recess 81 for the hold-down plate 70A illustrated at left therein. In addition, each of the regions of the hold-down plates 70A, 70B which overlap the intermediate bar 20 is configured with a downward embossment 70C which extends downward toward the toothed bar 20 and thereby functions as a hold-down device for the toothed bar 20.

A similar hold-down plate 70B overlaps a part of the second row of teeth 22 in a similar manner, as well as the second tensioning pinion 32 found there and the associated second locking pinion 42. This second hold-down plate 70B is again fixed—that is, riveted or bolted—to the outside belt part 4 via a bolt 79. The two hold-down plates 70A and 70B illustrated in FIG. 4 are again attached by means of axle pins 34, 35 to the outside belt end 4 of the internal sealing collar.

Figure 6:
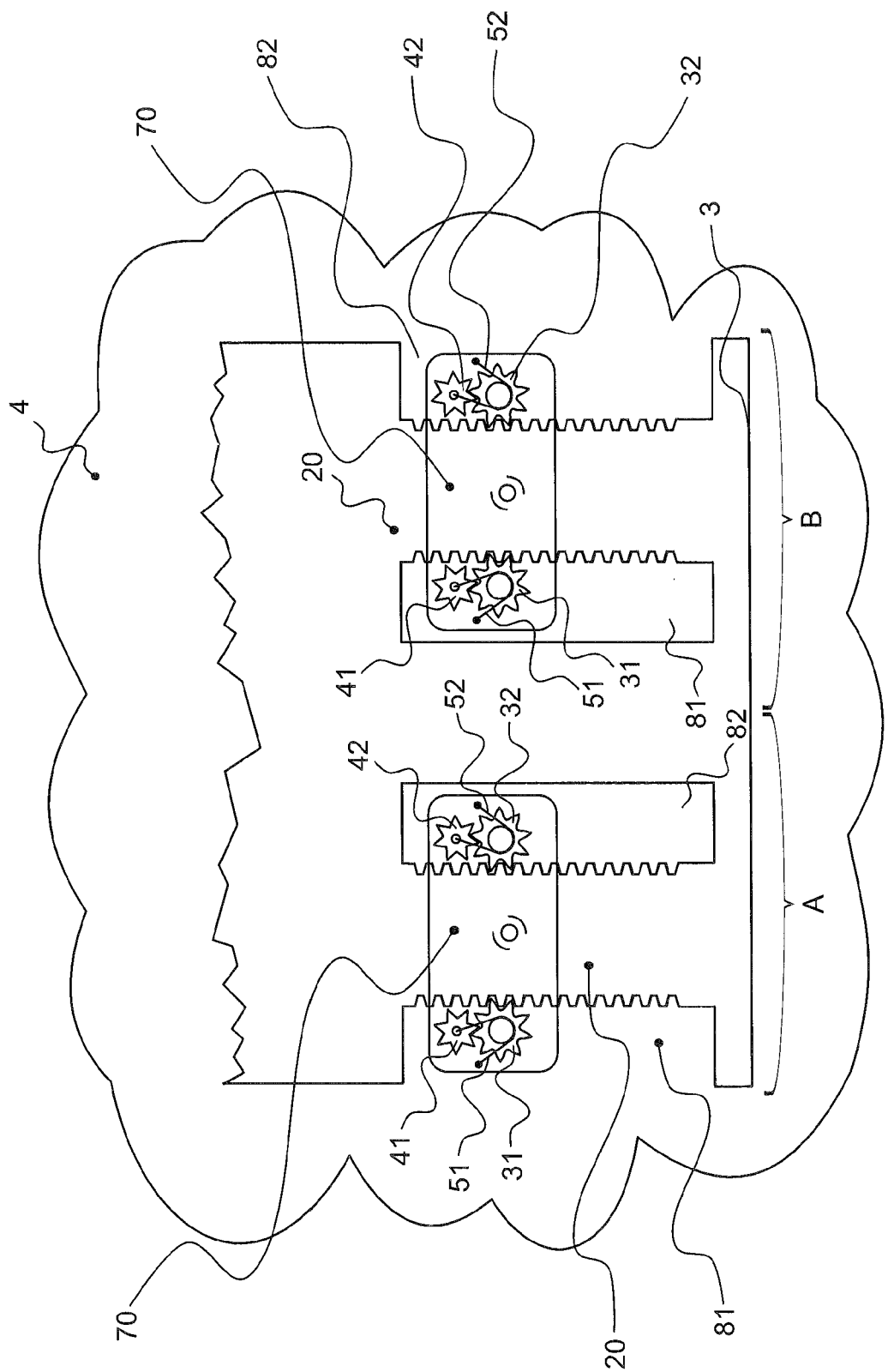
FIG. 6 is a line drawing evidencing a cutaway view of an internal sealing collar which is similar to the illustrations in FIGS. 3 and 4, but according to a fourth embodiment.

The third embodiment illustrated in FIG. 6 is similar to the embodiment in FIGS. 1 to 3. However, in the regions A and B, two identical arresting devices 10 arranged parallel to each other are configured in the embodiment. The reference numbers used above are used again in FIG. 6, but doubled.

Figure 7:
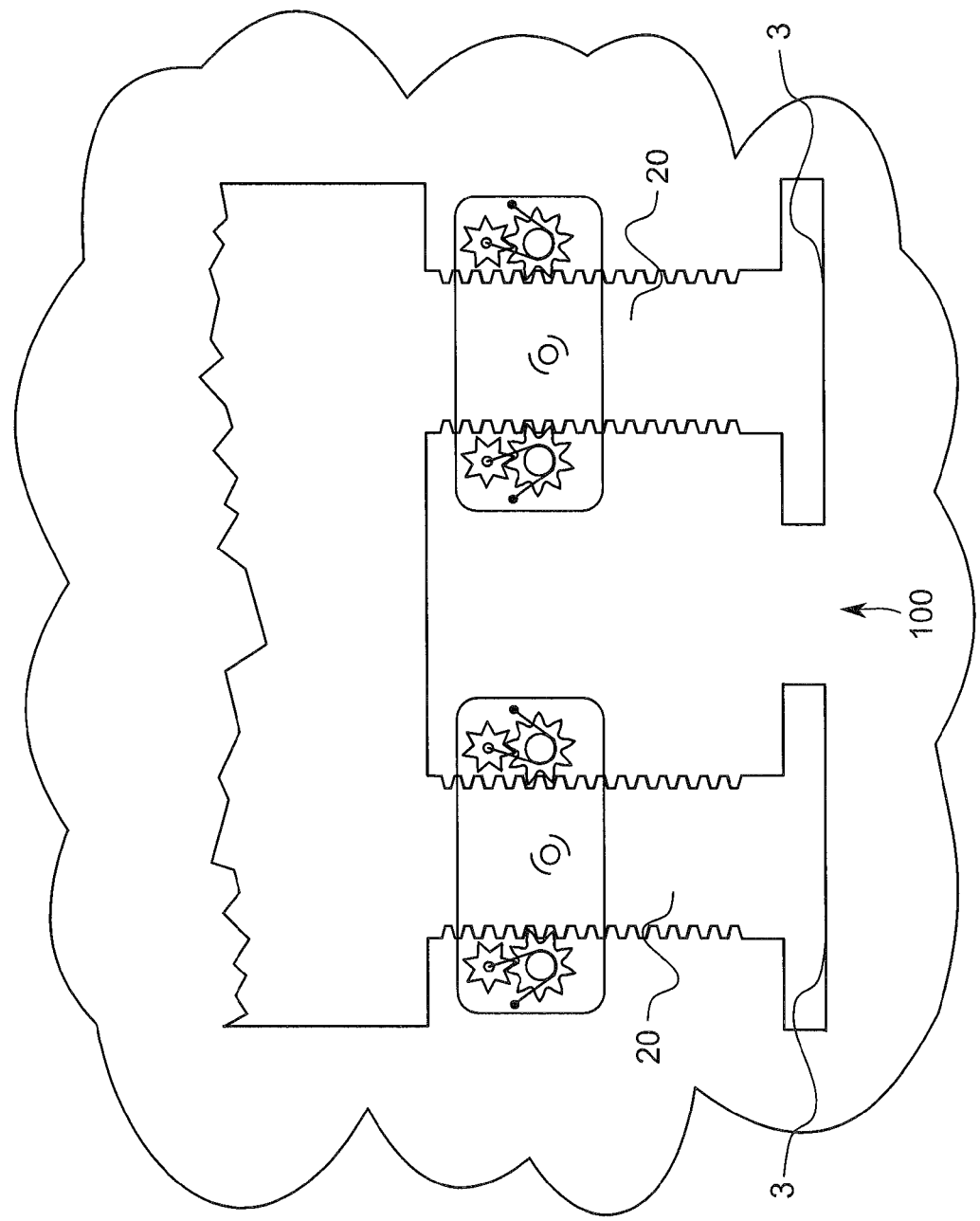
FIG. 7 is a line drawing evidencing a cutaway view of an internal sealing collar which is similar to the illustration in FIGS. 3 and 4, but according to a fifth embodiment.

A further embodiment of an internal sealing collar is shown in detail in FIG. 7. The illustration corresponds to the embodiment in FIG. 6, with one difference. The difference is that a slot and/or gap 100 is included between the two toothed bars 20, extending from the one end of the two toothed bars 20 to the other end of the toothed bars, and projecting further to the end of the outside belt part 3. This gap and/or slot 100 makes it possible to compensate for a twisting of the internal sealing collar when the same is tensioned. The gap and/or slot 100 in this case has a design with a width such that the corresponding parts of the inside belt end 3 do not overlap when the internal sealing collar is twisted.

Finally, it is noted that the toothed gears illustrated—that is, the two tensioning pinions 31, 32 and the associated locking pinions 41, 42—can have different tooth counts. In addition, these toothed gears can also have designs with different heights and/or different thicknesses. However, a configuration wherein these toothed gears are identical in both tooth count and thickness is also within the scope of the invention.

At least the toothed gears consist advantageously of steel—preferably V4A steel—or titanium. Titanium has the advantage of being resistant to acid. The hold-down plates 70 can also be manufactured from these materials.

Finally, it is noted that the internal sealing collar can be entirely surrounded, on its outer side, by a tube made of rubber-elastic material. In addition, it is also possible that the internal sealing collar 1 is connected, on the outer side, with rubber elastic sealing strips. This increases the sealing effect of the internal sealing collar 1 when the same is placed on the pipe being sealed.

Figure 8:
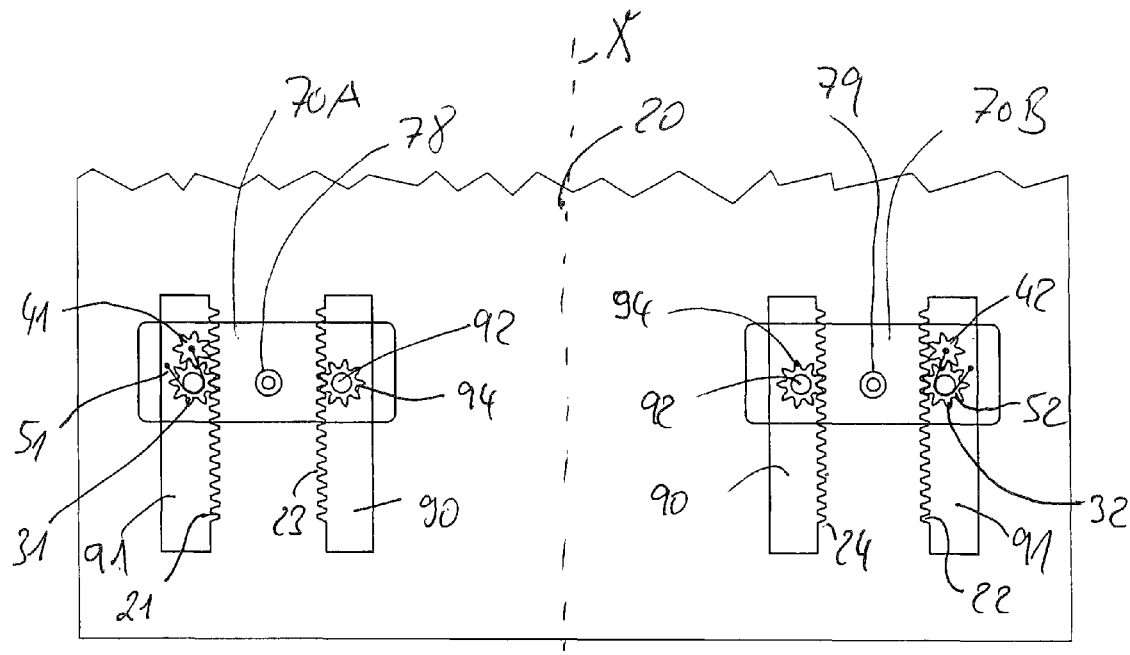
FIG. 8 is a line drawing evidencing a cutaway view of an internal sealing collar according to a sixth embodiment.

A sixth embodiment of an internal sealing collar according to the present invention is shown by way of example in FIG. 8, in the region of the arresting mechanism. The reference numbers used above continue to indicate the same parts. The arresting mechanism in this case includes two toothed bars which are arranged in mirror image to each other along a center line X, positioned respectively to the left and right of a slot 90, 91—in the top view in FIG. 8 of the left part of the arresting mechanism—the slot 91 is positioned closer to the left edge of the belt 20, while the slot 90 is arranged closer to the center line X, and runs parallel to this center line X. The slot 91 has a straight contour toward the left belt end, and comprises a row of teeth 21 on its side which faces the center line X. The tensioning pinion 31 and the locking pinion 41 engage with this row of teeth 21 in the manner described above. The locking pinion 41 also meshes with the tensioning pinion 31. The spring element is again indicated with the reference number 51. The right slot 90 has a straight contour toward the center line X, and comprises a row of teeth 23 which faces the row of teeth 21. A bolt 92 is positioned in the slot 90, wherein a toothed gear and/or pinion 94 is mounted on the same in a manner allowing rotation. This toothed gear 94 meshes with the row of teeth 23. A hold-down element 70A overlaps the slot 90, 91 in the manner illustrated in FIG. 8 in the region of the tensioning pinion 31, locking pinion 41, and toothed gear 94 configured at that position. The hold-down element 70A again establishes a fixed connection between a bolt 78 and the belt 2.

In a similar manner, a further arresting mechanism is positioned in a mirror image on the right side of the center line X. The two slots 90, 91 comprise rows of teeth 22, 24 which face each other. A bolt 92 engages in the left slot in FIG. 8, wherein a toothed gear is mounted on the same in a manner allowing rotation, and engages with the row of teeth 24. A tensioning pinion 32 and a locking pinion 42 are mounted in the manner described above in the slot 91 illustrated at far-right, wherein the locking pinion 42 is pressed against the tensioning pinion 32 via the spring element 52. A hold-down element 70B overlaps the slot 90, 91 in a similar manner to the hold-down element 70A, in the region of the toothed gears and/or pinions mentioned above. The hold-down element 70B is fixed to the belt 2 via a bolt 79.

Figure 9:
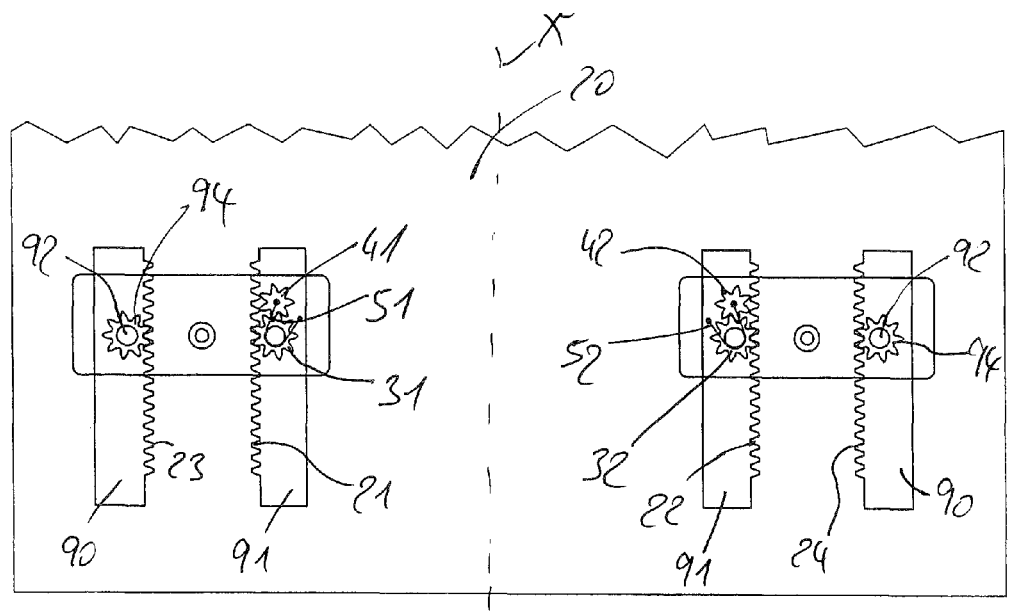
FIG. 9 is a line drawing evidencing a cutaway view of an internal sealing collar according to a seventh embodiment.

The embodiment illustrated in FIG. 9 is very similar to the embodiment in FIG. 8. However, the toothed gears and pinions are arranged in the slots 90, 91 in opposite configurations to each other. This means that in FIG. 9, in the slot 90 illustrated at left—that is, the slot which is closest to the left belt end—a bolt 92 projects into the slot 90, wherein a toothed gear 94 is mounted on the same in a manner allowing rotation. This toothed gear 94 meshes with the row of teeth 23. A slot 91 is positioned to the right thereof, with a row of teeth 21 which the tensioning pinion 31 and the locking pinion 41 engage with. A similar arrangement of tensioning pinion 32, locking pinion 42, spring element 52, and bolt 92 is found on the right side of the center line X in FIG. 9, placed in mirror image.

Figure 10:
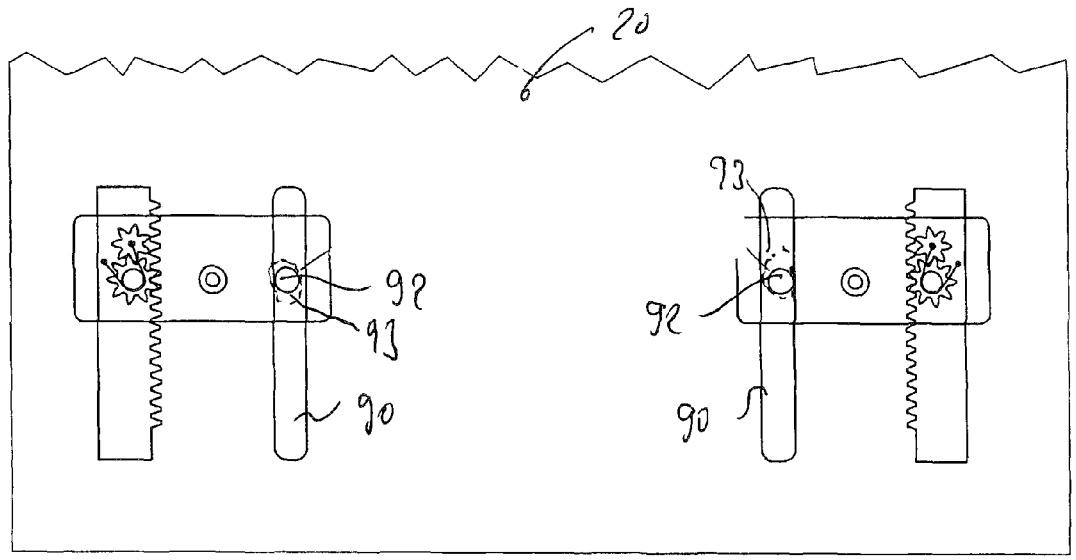
FIG. 10 is a line drawing evidencing a cutaway view of an internal sealing collar according to an eighth embodiment.
Figure 11:
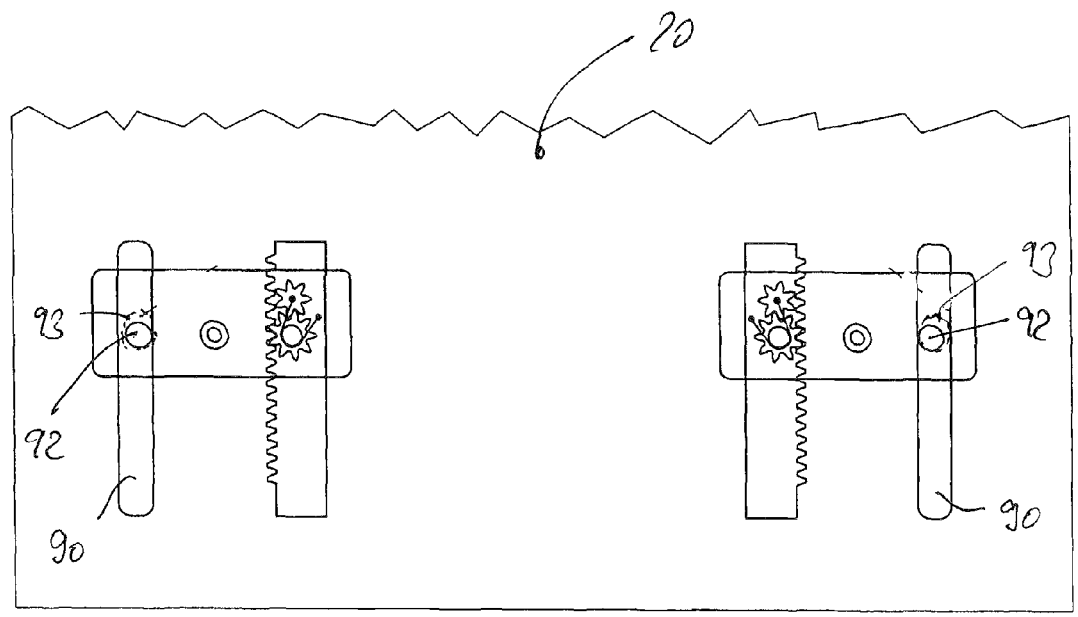
FIG. 11 is a line drawing evidencing a cutaway view of an internal sealing collar according to a ninth embodiment.

The embodiments in FIG. 10 and FIG. 11 are similar to the embodiments in FIG. 8 and FIG. 9. The only difference is that in this case there is no row of teeth constructed in the slots 90. Rather, only one bolt 92 projects into these slots, wherein a disk 93 which is capable of rotation is preferably mounted on the same. This rotating disk 93 is supported in the slot 90 on one edge.

LIST OF REFERENCE NUMBERS 1 internal sealing collar
2 belt
2A end-face belt
3 inside belt part, belt end
4 outside belt part, belt end
10 arresting device
20 toothed bar
21 first row of teeth
22 second row of teeth
24 first longitudinal edge
25 second longitudinal edge
31 first tensioning pinion
32 second tensioning pinion
41 first locking element
42 second locking element
43 bore hole
44 bore hole
34 axle pin
35 axle pin
51 first spring element
52 second spring element
70 hold-down plate
70A hold-down plate
70B hold-down plate
70C downward embossment
71 bore hole
72 bore hole
74 hold-down element
78 bolt
79 bolt
81 first recess
81a straight longitudinal edge
82 second recess
82b transverse edge
82c transverse edge
90 slot
91 slot
92 bolt+
93 disk, rotating element
94 toothed gear
100 gap on inside belt end 3

A first region
B second region
P1 arrow
P2 arrow
2A edge
I-I cutaway line
X center line The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. An internal sealing collar for insertion into pipes to seal leak points in the same, comprising a belt which is compressed circularly and can be expanded, made of sheet steel, the belt parts overlap in the peripheral direction at least partially, and having an arresting device which comprises at least two rows of teeth which are arranged parallel to each other, wherein one tensioning pinion for each of at least two of the rows of teeth engages in the same, further comprising wherein one locking pinion is functionally assigned to each of the at least two tensioning pinions, each locking pinion pressing against the associated tensioning pinion via one spring element each, and engaging with the same, and wherein each of the locking pinions additionally engages with the associated row of teeth.

2. The internal sealing collar of claim 1, wherein, for each of the at least two rows of teeth, one of the tensioning pinions engages in the same.

3. The internal sealing collar of claim 1, wherein two rows of teeth are arranged on opposite longitudinal edges of a toothed bar constructed on the inside belt part.

4. The internal sealing collar of claim 1, wherein each of the locking pinions has a lower tooth count than the associated tensioning pinion.

5. The internal sealing collar of claim 1, wherein each of the spring elements is a tensioning spring which is fixed by one end thereof, directly or indirectly, to the outside belt part, and on the other end thereof is inserted in an axle region of the associated locking pinion.

6. The internal sealing collar of claim 5, wherein the two tensioning pinions are each fixed on the outside belt part via their own axle pin, and the associated spring elements at least partially wind around each of these axle pins.

7. The internal sealing collar of claim 1, wherein each of two opposing rows of teeth of the toothed bar belongs to an elongated first recess and an elongated second recess, respectively, the same running parallel to each other.

8. The internal sealing collar of claim 7, wherein the two recesses are each designed as slots.

9. The internal sealing collar of claim 8, wherein at least one of the recesses (82) extends from one row of teeth (22) of the toothed bar (20) to an end-face end (2A) of the belt (2).

10. The internal sealing collar of claim 1, wherein each of the locking elements and/or locking pinions (41, 42) has an overhung mounting.

11. The internal sealing collar of claim 1, further comprising wherein a hold-down plate is included which is attached on the outside belt part and overlaps at least one of the two rows of teeth with the associated tensioning pinion and locking element.

12. The internal sealing collar of claim 1, wherein the hold-down plate comprises a hold-down element—particularly a hold-down bolt—on the side thereof which is functionally assigned to the toothed bar, for the purpose of pressing the toothed bar toward the outside belt part.

13. The internal sealing collar of claim 1, wherein the axle pins of the two tensioning pinions are designed as bolts or rivets, each projecting through corresponding bore holes of the hold-down plate.

14. The internal sealing collar of claim 1, wherein the hold-down plate overlaps at least a part of the two rows of teeth, as well as the associated tensioning pinion and locking elements.

15. The internal sealing collar of claim 1, wherein two hold-down plates are included.

16. The internal sealing collar of claim 15, wherein each of the two hold-down plates (70) additionally overlaps a slot which runs parallel to the respective row of teeth (21, 22), wherein a fixed bolt sits in said slot.

17. The internal sealing collar of claim 1, wherein for each of the two rows of teeth, one slot, positioned opposite, is functionally assigned to the same—a bolt projecting into said slot.

18. The internal sealing collar of claim 17, further comprising wherein an element which is able to rotate, particularly a rotating disk, is mounted on the bolt or bolts.

19. The internal sealing collar of claim 18, further comprising wherein a toothed gear is mounted on the bolt and meshes with a further row of teeth arranged in the slot.

\* \* \* \* \*